INVENTORS
LEON BADGUERAHANIAN
THOMAS KEMP
BY
Bauer and Seymour
ATTORNEYS

INVENTORS
LEON BADGUERAHANIAN
THOMAS KEMP
BY
ATTORNEYS

United States Patent Office 3,578,649
Patented May 11, 1971

3,578,649
PREPARATION OF VINYL POLYMERS
Leon Badguerahanian, Montlignon, and Thomas Kemp, Bois-Colombes, France, assignors to Produits Chimiques Pechiney Saint-Gobain, Paris, France
Filed June 23, 1964, Ser. No. 377,230
Claims priority, application France, Mar. 10, 1964, 966,799
Int. Cl. C08f 1/11, 3/00, 3/30
U.S. Cl. 260—92.8          6 Claims

ABSTRACT OF THE DISCLOSURE

Vinyl monomers, of which vinyl chloride is exemplary, are polymerized in suspension in aqueous medium and the conditions of polymerization produce superior products by withdrawing vaporized product, condensing it, and returning it to the suspension, producing, by aid of exterior heat exchange, equality of internal and external temperature. The product has notable superiority, especially in its acceptance of plasticizers and other modifiers.

---

Figure 1:
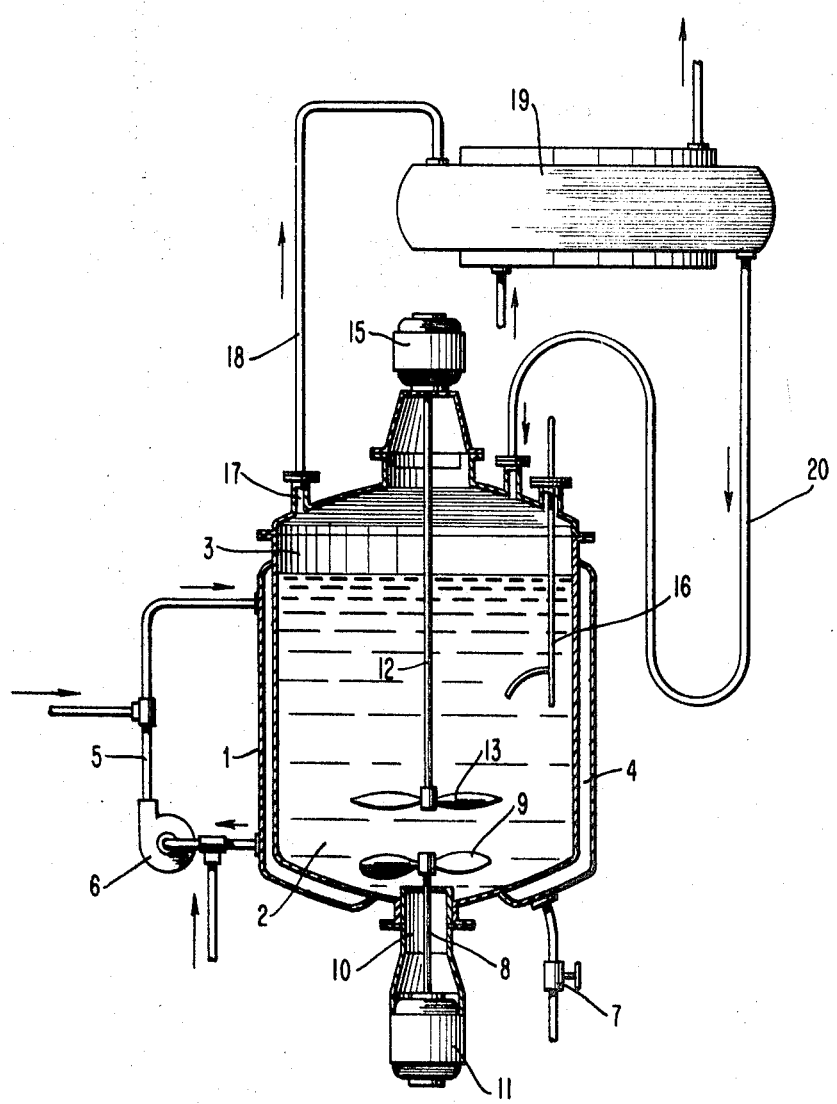

This invention relates to the preparation of vinyl polymers and copolymers by polymerization of vinyl monomers alone or mixed, in suspension. The invention also includes a new apparatus for carrying out the process.

It has already been proposed to polymerize vinyl monomers, for instance vinyl chloride, in aqueous suspension using high speed agitation by means of a turbine with a directional crown, which may be associated with a slow speed agitator, for instance of blade type, if desired. That process has demonstrated technical superiority, but has certain imperfections among which the rapid formation of crusts on the walls of the reaction chamber is notable. Those crusts form points of attachment to which the polymer tends to adhere.

It is an object of the invention to polymerize vinyl monomers alone or in admixture with other monomers in suspension in aqueous medium with high speed agitation, with a reduced formation of crusts, with evener temperatures through the mass, with the production of more homogeneous and better polymers or copolymers, with reduction of the number and size of polymeric aggregates in the product, and with better control of the process. A particular object of the research from which the invention sprang was to discover the reason for the formation of crusts and aggregates and to devise methods and apparatus for reducing or eliminating them. Another object was to prepare more homogeneous polymers, of better and more uniform qualities. Another object was to make superior, mixed polymers, utilizing vinyl monomers in the presence of other resins or resin-forming materials. Another object was to produce polymers with better granulometry, more uniform density, and better able to accept plasticizers.

The objects of the invention have been accomplished, generally speaking, by a method of polymerizing a vinyl monomer in suspension which comprises suspending in an aqueous medium a vinyl monomer which is volatile at the temperature of the polymerization, agitating the suspension at high speed, withdrawing vaporized monomer from above the polymerization space, condensing it, and returning it as a liquid to the polymerization mass. As to the novel apparatus, the objects of the invention have been accomplished by polymerization apparatus including as its essential elements an enclosed polymerization chamber, a condenser, means to flow vapors from the chamber to the condenser, means to flow condensate from the condenser to the chamber, and means to heat the internal wall of the chamber to a temperature not substantially below the internal temperature of the polymerization mass.

The process employs the homopolymerization or copolymerization of vinyl monomers in suspension with high speed agitation, on the order of hundreds or thousands of r.p.m. with or without slow agitation of classic type of tens or a few hundred r.p.m., while assuring a better thermal equilibrium in the reaction mass than has heretofore been obtained. This thermal equilibrium is produced by condensing the vapors of the monomers used in a refrigeration circuit outside the autoclave which includes a reflux condenser which returns the condensed monomer to the polymerization vessel which, in the case of vinyl chloride and some other vinyl monomers is an autoclave.

For efficiency, and to assure maximum thermal equilibrium, in the reaction mass, it is advisable to maintain under reflux as much as five times the weight, per hour, of the monomer in the autoclave undergoing polymerization. In attaining this objective it is also advisable to keep the part of the reaction mass at the wall of the autoclave at a temperature at least equal to that in the middle of the reaction mass. In order to check this operation it is advisable to furnish the vessel with a thermometer located in the center and one located at the wall so that frequent comparison may be made of the temperature of the reaction mass at the wall with that in the center of the vessel. Thus, the internal face of the vessel should be at a temperature at least equal to that of the mass at the center and the difference of temperature should be not over 10° C. and preferably not over 3° C. The essential thermal equilibrium is achieved by evaporating the volatile components of the reaction medium, removing them from the vessel, condensing them in a reflux condenser and returning the condensate to the reaction vessel.

The condensation and recycling of the monomer can be accomplished either when the temperature of the reaction medium begins to rise, or at any time which is chosen for the control of the reaction. It is to be understood that the quantity of each cycle of the monomer after condensation can be controlled by regulating the flow of the condensed monomer or by regulating the quantity of cooling liquid which passes through the cooling apparatus attached to the autoclave.

The high speed agitation of the reaction mass may be assured by means of a turbine having high peripheral speed, at least 10 meters per second being desirable. This high peripheral speed can be achieved by rotating a small diameter turbine at high speed, desirably at at least 400 r.p.m. and, if possible, even higher. This high speed agitation of the reaction medium may be accompanied by a low speed agitation, if desired, for which purpose the anchor type or blade type agitators of the prior art are satisfactory.

While the condenser circuit for the evaporated monomer is in action, it is preferable to keep the turbine running; it can be stopped during the course of the reaction if desired.

The process, which is the object of the invention, can be applied to all types of polymerization and copolymerization in suspension which employ vinyl monomers as raw material, with or without the use of adjuvants such as protective colloids. The process is particularly useful in the polymerization of vinyl monomers such as vinyl halides, vinylidene halides, vinylidene cyanides, vinyl acetate and acrylonitrile, as well as to the copolymerization of various combinations of such monomers. The process is particularly satisfactory when employed in the polymerization or copolymerization of vinyl chloride in suspension.

The advantages of the invention are substantial:
It improves the qualities of the products obtained. When the condenser circuit for monomer vapors is used and permanent degassing of the reaction mass occurs, which produces polymer grains, they are more compact and of improved porosity. These new compounds accept plasticizers readily. In particular, the possibility of controlling the reflux operation may also be used to change the granulometry of the product.

It is possible, if the reaction or condenser circuit has been put into service, either to enlarge the grains of the polymer or to reduce their size. In order to accomplish this, the quantity of monomer refluxed is controlled. As a result there is an almost total disappearance of the formation of crusts on the autoclave and the formation of polymer aggregates in the reaction medium is prevented.

This invention solves the problem of heat exchange which is necessary to good progress of the reaction by withdrawing such monomer vapors through a condenser circuit and returning the condensate to the polymerization vessel. This produces a large heat exchanging surface which works with a particularly favorable coefficient of exchange. For example, a heat exchange surface according to this invention, will have the same effect as one twice or four times its size provided by direct jacketing of the prior art. For this reason, one may either accerate the progress of the reaction, or increase the charge in the autoclave, or use a lower temperature of polymerization, or use in the condenser circuit a heat exchanging fluid of room temperature in place of a refrigerated fluid while preserving adequate margin of operational security.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

Figure 2:
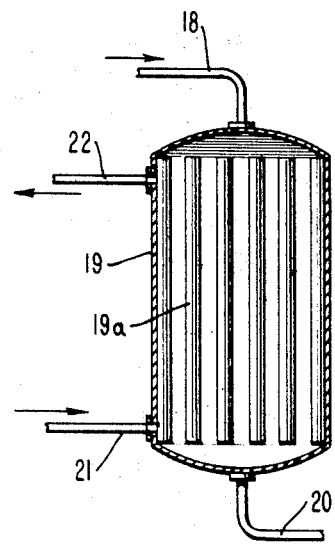

In the drawings, wherein like reference characters refer to like parts throughout the several views, FIG. 1 is a diagrammatic view of an apparatus adapted to the performance of the process;

FIG. 2 is a more detailed view of the condenser and its operating means.

Referring to the numerals of the drawings, autoclave 1 of fixed, vertical type includes the reaction vessel 2 sealed by a tight cover 3. The reaction vessel is surrounded by a heat exchanging jacket 4 through which a heat exchanging fluid may be flowed from an exterior circuit 5 in which a heat exchanger 6 is located. The jacket 4 has a drain pipe with a valve 7 at this lower point. During the polymerization a circulation of fluid, preliminarily heated by exchanger 6 to a temperature above that of the reaction medium, may be carried out so as to heat the wall of the reaction chamber. On the other hand, a cooling fluid, preliminarily cooled, may be circulated so as to remove calories released during the course of the reaction. This arrangement provides a certain degree of security when it is necessary to maintain the thermal equilbrium of the reaction medium, particularly during the last phases of the process. The autoclave 2 is penetrated by the shaft 8 which carries a turbine type agitator 9. The seal between the walls 2 and the shaft 8 is made by a mechanical stuffing box 10. The shaft 8 is driven by a motor 11 using a reduction gear, if desired. The turbine is usually driven between 400 and 3,000 r.p.m. These values are not limits but indicate a preferred operating range. The cover 3 is penetrated by the shaft 12 which carries a 3-blade helical agitator of large diameter at its lower end. The seal between the cover 3 and the shaft 12 is also maintained by a stuffing box. The shaft 12 is driven by a motor 15, with or without reduction gear, at speeds which are generally below 300 r.p.m. When the agitator 13 is in an autoclave of large capacity, it may be provided with plungers 16 which assist in obtaining a good homogenization of the contents of the atuoclave. A conduit 18 is attached to fitting 17 of the cover and to the condenser 19, which may be of a standard type such as vertical, horizontal, and serpentine, preferably having tubes of large size within which flows the monomers, not the heat exchanger. After condensation the monomer returns to the autoclave through U-shaped guard tube 20. If one uses a vertical condenser the same tube and fitting will carry the ascending monomer vapors and the reflux of condensed monomer.

Certain changes may be introduced into the construction of the apparatus without departing from the invention. For example one may introduced the turbine from above or from the side rather than from the bottom of the autoclave. When introduced from above, the dimensions of the apparatus should permit the use of a short shaft in order to prevent whipping of the shaft. Similarly, in certain cases, the slow agitator can be eliminated, on condition of using a high speed agitator of sufficient power to complete the homogenization of the entire contents of the autoclave.

Figure 3:
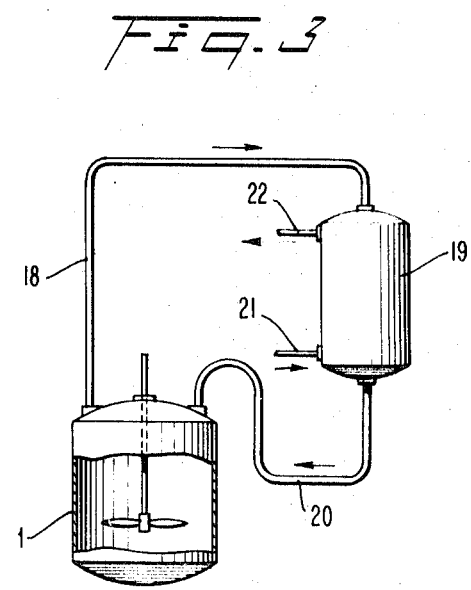

FIGS. 3–7 are schematic diagrams of various condenser arrangements. FIG. 2 is a vertical, schematic diagram through the water tube condenser in which the flow is as indicated in FIG. 3, the vinyl chloride vapors entering the condenser 19 at the top and flowing downward between the tubes 19a which are supplied with refrigerating fluid 21, 22, for instance brine, at a temperature of 5° C. which enters by pipeline 21 and leaves by pipeline 22.

In FIG. 3, the autoclave 1 is connected by line 18 to the tube of condenser 19 and the condensate passes through the line 20 back to the top of the autoclave, the pipeline being arranged in the form of a U-shape which extends below the level of the liquid in the autoclave, preventing flow in the reverse direction.

Figure 4:
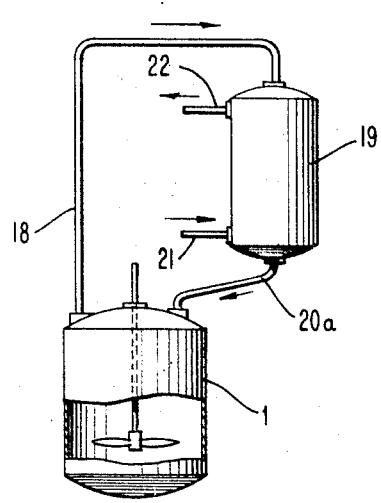

As indicated in FIG. 4, the U-shaped tube is useful but not essetnial; the difference between the specific gravities of the vapor and the condensed vapor creates a flow from the condenser to the autoclave.

In this case the vapors may go both ways in pipe 20a while the liquid all goes in the direction of the arrow.

Figure 5:
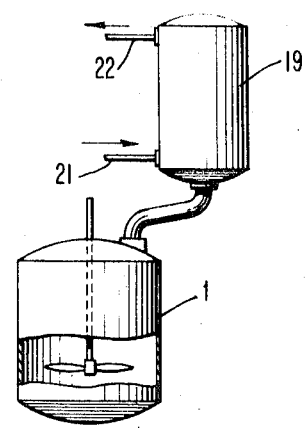

In FIG. 5 the condenser 19 has a single, large pipeline 18a in the top of the autoclave, the vapors making their way into the condenser and the liquids being returned through the same pipeline.

Figure 6:
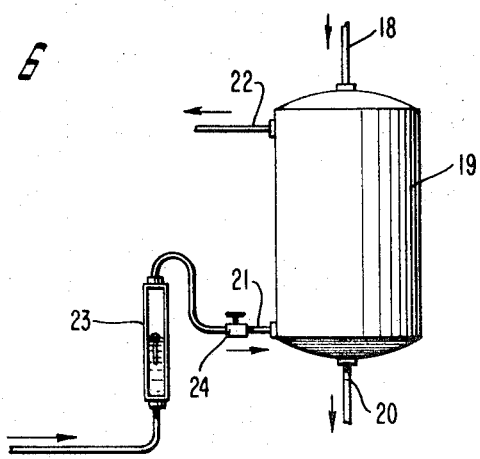

In FIG. 6 the flow of cooling medium through the condenser is kept constant during the operation by means of a flow meter 23 and a valve 24, providing the control of superior conditions within the mass undergoing polymerization.

Figure 7:
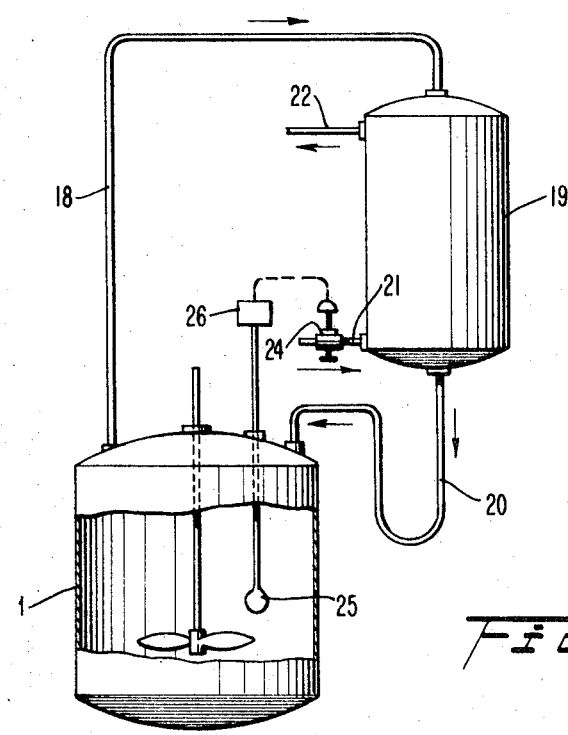

In FIG. 7 the temperature in reactor 1 is kept constant by means of thermometer 25, a valve 24 and the regulator 26 which operates the valve in accordance with the temperature shown by the thermometer. For example, if the thermometer 25 shows a temperature of 59.9° C. the valve 24 will be closed by apparatus 26, but if the thermometer 25 shows a temperature of 60.1° C. the apparatus 26 will open the valve. Temperature operated valve mechanisms are well known and do not need detailed description.

The following examples illustrate but do not limit the generality of what is elsewhere hereinstated.

EXAMPLE 1

A vertical autoclave of 750 liters capacity, of stainless steel, having a blade type agitator of classic type with blades 660 mm. in diameter, rotating at a speed of 100 r.p.m. was used. The autoclave was also provided with a high speed agitator constituted by a turbine 85 mm. in diameter, rotating at 3000 r.p.m. It received 200 kg. of vinyl chloride, 200 g. of lauroyl peroxide, as catalyst, 200 g. of polyvinyl alcohol, and 400 kg. of water.

The polymerization was carried out at 60° C. and the flow of refluxed monomer toward the autoclave was twice the quantity of monomer undergoing polymerization. Polymerization went forward for 10 hours. The entire heat exchange was carried out in a horizontal, reflux condenser having ½ m.² of exchange surface. During the polymerization the walls of the autoclave were heated by flowing a hot liquid through a double envelope provided for that purpose to maintain a temperature on its inner wall several degrees above the temperature in the center of the mass. At the end of the test it was found that the wall of the autoclave was wholly free from incrustation by polymer. The polymer was granular and the grains were homogeneous in size, varying from 60–140 m$\mu$ in diameter. The apparent density of the polymer was .5.

EXAMPLE 2

This example is given for comparative purposes. It describes an operation carried out by a standard prior art process in an autoclave having a double envelope through which flows a refrigerated liquid designed to maintain the thermal equilibrium of the reaction medium. No condenser was used. The kinds and quantities of the ingredients of the reaction mass were the same as in Example 1. At the end of the operation, carried out for the same period of time, there was incrustation of the surface of the walls of the autoclave by a pellicle of polymer which was difficult to remove. The granulometry was from 40–120 m$\mu$ and the apparent density was .5. The larger average grain size of the product of Example 1 is advantageous.

EXAMPLE 3

An autoclave of 3000 liters capacity, of stainless steel, having a typical blade type agitator 1000 mm. in diameter, rotating at 90 r.p.m., and a high speed agitator of turbine type, 140 mm. in diameter, revolving at 1500 r.p.m., received 800 kg. of vinyl chloride monomer, 800 g. of lauroyl peroxide catalyst, 100 g. of polyvinyl alcohol, and 1500 kg. of water. The reflux in the condenser was regulated so as to return in each hour an amount of vinyl chloride equal to that remaining in the autoclave. The polymerization reaction continued for 8 hours at 60° C. producing a polymer of homogeneous porosity which accepted plasticizer readily. The apparent density of the powder was .5.

EXAMPLE 4

An autoclave of 120 liters capacity, having a slow speed agitator 440 mm. in diameter, rotating at 100 r.p.m., and a high speed agitator 140 mm. in diameter, turning at 1500 r.p.m., received a charge of 20 kg. of vinyl chloride, 5 kg. of vinyl acetate, 12.5 g. of lauroyl peroxide, and 50 g. of polyvinyl alcohol. The operation of copolymerization was carried out at 70° C. The refluxing of monomer vapors varied from 0 to 75 kg. per hour at different times during the operation of the process. At the end of the operation a copolymer was produced having grains from 100–250 m$\mu$ in diameter and of apparent density .55. The copolymer had better molding and shaping properties than similar polymers made by prior art methods.

EXAMPLE 5

An autoclave of 25 m.³ capacity, having a slow speed agitator with blades 1200 mm. in diameter, rotating at 90 r.p.m., and having a high speed agitator of turbine type 250 mm. in diameter, spinning at 1500 r.p.m., received a total charge of 7 metric tons of vinyl chloride monomer, 14 kg. of methylcellulose, 14 kg. of lauroyl peroxide and 15 metric tons of water. Polymerization continued for 5 hours at 60° C. A large part of the calories released were removed in the condenser and the internal thermal equilibrium of the reaction mass was maintained by the cooperating use of heat exchange fluid (water) in the jacket of the autoclave. The polymer had granulometry of 100–200 m$\mu$ and apparent density of 0.45.

EXAMPLE 6

The operation of Example 5 was carried out without using a condenser. It was necessary to reduce the quantity of catalyst to 5 kg. and to extend the polymerization to a minimum of 10 hours as it was impossible to remove the heat uniformly from the reaction mass. As a result, the productivity of the installation was reduced. There was substantial incrustation on the walls of the autoclave.

According to this invention vinyl type monomers are polymerized, a term which includes homopolymerization and copolymerization, with high speed agitation with or without low speed agitation, while accomplishing the essential thermal stabilization of the reaction mass by condensation and refluxing of monomer vapors in and from an apparatus outside the autoclave, and which includes a reflux condenser, conduit means to bring the monomer vapors to the condenser, and the same or other conduits to carry the condensate back to the autoclave.

In the operation of this process, the quantity of monomer vapors removed and recycled by condensate is regulated so as to control the thermal equilibrium of the reaction process and preferably so that the walls of the autoclave are maintained at a temperature at least equal to that existing in the center of the reaction mass. To this end cooperating, peripheral heat exchange may be used.

To attain maximum thermal equilibrium in the reaction mass, the quantity of monomer condensed and refluxed may attain an hourly value five times that of the useful charge of monomer remaining in the autoclave.

The condensation and recycling of monomer may begin with the start of the polymerization or at any time during the operation at which control becomes necessary. The quantity of monomer recycled is determined either by controlling the return flow of condensed monomer or by controlling the flow of heat exchanging liquid in the condenser.

In prior systems of polymerization, it was necessary to maintain the peripheral reaction mass at a temperature materially cooler than that in the center, thus setting up different rates and results of polymerization at different places in the reaction mass, an unstable operation inconsistent with uniformity of result and contributing to the formation of crusts on the reactor walls. According to the present invention the jacket is used to maintain the temperature at the walls at least equal to that in the center. The main control of the reaction is by the evaporation and refluxing of the monomer.

As many apparently widely different embodiments of the present invention may be made without departing from the spirit and scope thereof, it is to be understood that the invention is not limited to the specific embodiments.

What is claimed is:

1. A method of polymerizing a vinyl monomer in suspension which comprises suspending in an aqueous medium a vinyl monomer which is volatile at the temperature of the polymerization, agitating the suspension at high speed, establishing the temperature of the periphery of the suspension at least at the internal temperature of the suspension, and controlling the temperature of the suspension by withdrawing vaporized monomer from the space above the suspension, condensing it, and returning it to the suspension.

2. A method of polymerizing a vinyl monomer in suspension according to claim 1 which comprises agitating the suspension by simultaneously generating opposed high speed and low speed currents, removing vaporized monomer from above the suspension, condensing it, recycling the condensate to the highly agitated suspension, and establishing and maintaining the peripheral temperature of the suspension within 10° C. above the central temperature of the suspension.

3. The process of claim 1 in which the peripheral temperature of the agitated mass is maintained within 3° C. above the internal temperature of the mass.

4. A method of polymerizing a vinyl monomer comprising vinyl chloride which comprises suspending the monomer in aqueous medium in a space of constant volume containing a reaction space interconnected with a separate condensation space, establishing and maintaining temperature conditions in the reaction medium such that the temperature at the periphery is within 10° above the temperature at the center of the reaction medium, the aqueous medium is liquid, the monomer is volatile, and the polymerization proceeds efficiently, and controlling the thermal equilibrium of the suspension by condensing the volatilized monomer in the condensation space, returning the condensate to the suspension at a rate which maintains the reaction temperature of the reaction mass constant.

5. A method according to claim 4, and controlling the heat exchange in the condenser to control the polymerization.

6. A method of polymerizing a vinyl monomer in suspension according to claim 1 which comprises suspending in an aqueous medium a vinyl monomer which is volatile at the temperature of the polymerization, agitating the suspension at high speed and simultaneously at low speed, and maintaining the temperature at the periphery of the suspension, within about 10° C. above the temperature of the central part of the suspension, by peripheral heat exchange and by withdrawing vaporized monomer from the reaction space, condensing it, and returning condensed monomer to the suspension.

References Cited

UNITED STATES PATENTS

| 2,240,618 | 5/1941 | Harris, Jr., et al. | 23—285 |
| 2,383,069 | 8/1945 | Marks | 260—89.1 |
| 2,383,430 | 8/1945 | Weltman | 260—17.2 |
| 3,330,818 | 7/1967 | Derby | 260—94.9 |

FOREIGN PATENTS

| 723,991 | 2/1955 | Great Britain | 260—92.8W |

JOSEPH L. SCHOFER, Primary Examiner

J. A. DONAHUE, Jr., Assistant Examiner

U.S. Cl. X.R.

260—80, 85.5, 87.1, 87.5, 87.7, 88.7, 91.7